UNITED STATES PATENT OFFICE.

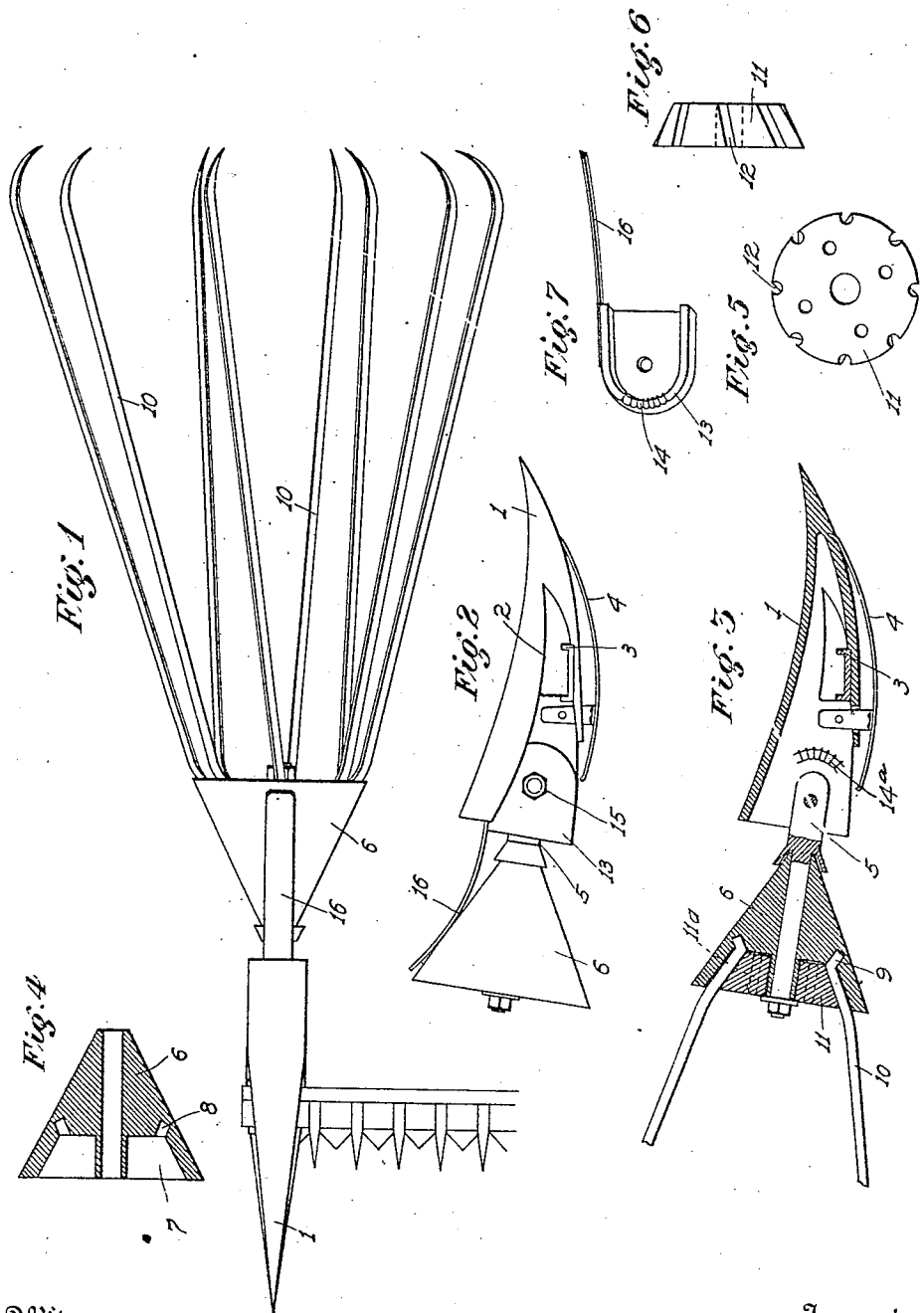

JAMES A. SOHN, OF IONE, CALIFORNIA.

MOWER.

1,012,736.  Specification of Letters Patent.  Patented Dec. 26, 1911.

Application filed May 15, 1911. Serial No. 627,181.

*To all whom it may concern:*

Be it known that I, JAMES A. SOHN, a citizen of the United States, residing at Ione, in the county of Amador, State of California, have invented certain new and useful Improvements in Mowers; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in mowers to be used for cutting hay or grain, the object of the invention being to produce a grass guard for mowers which will readily throw the grass to one side of the mower as it is cut, and do the same in a rapid and effective manner without clogging or stopping the machine.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a top plan view of a fragmentary portion of a cutter bar of a mower showing my improved guard thereon. Fig. 2 is a side elevation of the shoe and guard frame detached. Fig. 3 is a sectional view of the shoe and guard. Fig. 4 is a sectional view of the guard frame. Fig. 5 is a rear view of the retaining cone. Fig. 6 is a side elevation of the same. Fig. 7 is a side elevation of a cap and spring.

Referring now more particularly to the characters of reference on the drawings, 1 designates the usual shoe carried on the end of the mower, said shoe having an opening 2 and a channel iron 3 disposed in alinement with said opening whereby any size cutter bar may be received, there being a band spring 4 secured underneath said shoe 1. Said shoe 1 is hollow as shown in Fig. 3, and open at its rear end to receive a bar 5 in a pivotal manner, said bar 5 having bolted thereto a guard frame or cone 6, said cone 6 being provided at its outer end with a recess 7 and also a plurality of smaller recesses 8 extending obliquely with respect to said recess 7 to receive bent ends 9 on guard bars 10, which guard bars are held in fixed position in the cone 6 by means of a retaining cone 11 having side slots 12, which fit over the bars 10, the cone 11 being secured in the recess 7 by means of screws 11ª. The bars 10 are inserted in the cone 6 obliquely, whereby the frictional motion caused by the forward movement of the mower will cause said bars to revolve, thus throwing the hay or grain to one side, as is desired.

13 is a cap adapted to fit over the side of the shoe 1 to inclose the pivotal rod 5 and is provided with notches 14 adapted to fit into notches 14ª in the other side of the shoe 1, whereby said cap 13 may be set at any desired point to limit the movement of the guard, since it may be moved up or down and fixed in any position by means of a nut 15. Said cap 13 also has a projecting band spring 16, which presses against the top of the cone 6 to maintain the guard on the earth's surface and still by reason of the pivotal bar 5, said guard can conform itself to uneven surfaces, as will readily appear. The structure of having the retaining cone 11 and the bent ends 9 on the bars 10, readily permits said bars 10 to be held securely in position in the cone 6, and yet, should one of the bars break, it can readily be replaced. This is an advanced improvement over the old method of screwing the bars 10 into the cone, in which structure, if the bar breaks, then the threaded or screwed end must be bored out, which takes a great amount of unnecessary labor and expense.

From the foregoing description it will readily appear that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention, what I claim as new and useful and desire to secure by Letters Patent is:—

A grass guard for mowers comprising a shoe, a frame swiveled in said shoe, said frame having a recess in its outer end and a plurality of smaller recesses extending obliquely with respect to said main recess, a plurality of bars having bent ends to fit into said plurality of recesses, a retaining cone adapted to fit into said first named recess between said bars, and means for securing said retaining cone in position, as described.

In testimony whereof I affix my signature in presence of two witnesses.

JAMES A. SOHN.

Witnesses:
JOSHUA B. WEBSTER,
FRANK H. CARTER.